United States Patent
Pahlevaninezhad et al.

(10) Patent No.: US 9,537,424 B2
(45) Date of Patent: Jan. 3, 2017

(54) DC-BUS CONTROLLER FOR GRID-CONNECTED DC/AC CONVERTERS

(71) Applicants: Majid Pahlevaninezhad, Kingston (CA); Suzan Eren, Kingston (CA); Praveen Jain, Kingston (CA)

(72) Inventors: Majid Pahlevaninezhad, Kingston (CA); Suzan Eren, Kingston (CA); Praveen Jain, Kingston (CA)

(*) Notice: Subject to any disclaimer, the term of this patent is extended or adjusted under 35 U.S.C. 154(b) by 44 days.

(21) Appl. No.: 14/674,910

(22) Filed: Mar. 31, 2015

(65) Prior Publication Data
US 2015/0280610 A1    Oct. 1, 2015

Related U.S. Application Data

(60) Provisional application No. 61/973,536, filed on Apr. 1, 2014.

(51) Int. Cl.
*H02M 7/537* (2006.01)
*G05F 1/67* (2006.01)
*H02J 3/38* (2006.01)

(52) U.S. Cl.
CPC ............. *H02M 7/537* (2013.01); *G05F 1/67* (2013.01); *H02J 3/382* (2013.01)

(58) Field of Classification Search
CPC .. H02M 7/5387; H02M 3/335; H02M 3/158; H02M 3/156; H02M 3/33507; H02M 2001/009; H02M 7/537; G05F 1/67; G05F 1/66; H02J 3/382; H02J 3/383
See application file for complete search history.

(56) References Cited

U.S. PATENT DOCUMENTS

| | | | | |
|---|---|---|---|---|
| 2010/0308649 | A1* | 12/2010 | Kono | B60L 9/005 307/9.1 |
| 2011/0221420 | A1* | 9/2011 | Coccia | H02J 3/01 323/355 |
| 2012/0087159 | A1* | 4/2012 | Chapman | H02J 3/383 363/41 |
| 2012/0194161 | A1* | 8/2012 | Latham, II | H02M 3/156 323/286 |
| 2012/0217940 | A1* | 8/2012 | Kiadeh | H02M 3/156 323/271 |
| 2013/0229839 | A1* | 9/2013 | Escobar | H02M 1/12 363/40 |

* cited by examiner

*Primary Examiner* — Gustavo Rosario Benitez
(74) *Attorney, Agent, or Firm* — Brion Raffoul

(57) ABSTRACT

Systems, methods, and devices for controlling a DC-bus voltage for a power conditioning system. A control system regulates the DC value of the DC-bus voltage. The control system uses an adaptive DC-value estimator/observer to estimate this DC-value. Instead of having to determine the DC-value of a signal with a low frequency ripple without compromising the signal's dynamic response, a suitably precise estimate for that DC-value is used.

8 Claims, 11 Drawing Sheets

DC-BUS CONTROLLER FOR GRID-CONNECTED DC/AC CONVERTERS

TECHNICAL FIELD

The present invention relates to control systems for grid-connected DC/AC converters. More specifically, the present invention relates to systems and methods for use in controlling the DC-bus voltage in grid connected DC/AC converters.

BACKGROUND OF THE INVENTION

Renewable energy is the key to future global sustainability, and many endeavours are being made to harvest renewable energy in an efficient and profitable manner. Environmental concerns and diminishing fossil fuel reserves increase the urgency of transitioning towards clean renewable energies. This explains the exponential growth of wind turbine (WT) and photovoltaic (PV) usage in the past few years. However, the variable nature of the power produced by WTs and PVs makes their controllability a challenge. Furthermore, when connecting renewable energies to the grid, increasingly stringent grid connection standards must be met. These standards emphasize the importance of fast control, the quality of the injected power into the grid, and robustness. Two main issues must be addressed in order to bring grid-connected renewable energies into the mainstream: cost and controllability.

A typical power conditioning system for renewable energy applications has two stages, and therefore requires two separate control schemes. The first stage is called the input-side converter, and is typically an AC/DC rectifier for WTs (see FIG. 1A) or a DC/DC converter for PVs (see FIG. 1B). The second stage is called the grid-side converter, and is typically a DC/AC inverter for most systems. The main task of the input-side converter is to achieve Maximum Power Point Tracking (MPPT) and extract maximum power from WTs or PVs. The main task of the grid-side converter is to ensure that all of the power extracted by the first stage is transferred to the grid quickly. To achieve this, the voltage across the capacitor between the two stages, also called the DC-bus capacitor, must be regulated. Although the second stage converter should also perform other important tasks, such as injecting high quality current to the grid, islanding detection, synchronization, reactive power compensation, and other ancillary services, regulating the DC-bus voltage is vitally important in order to guarantee the reliable operation of the power conditioning system.

The DC-bus capacitor acts as an energy storage capacitor and provides the flexibility to alternate the instantaneous power in between the two stages, giving the system the ability to absorb sudden changes in power coming from the input-side converter. More importantly, in single-phase power conditioning systems, the DC-bus capacitor is used to decouple the power ripple by providing a low frequency current. The main challenge regarding the DC-bus voltage loop controller for grid-connected single-phase inverters is the presence of the low frequency ripple in the DC-bus capacitor voltage (this ripple is also present in three-phase unbalanced systems). In a conventional DC-bus voltage control scheme, a very low bandwidth PI controller is usually used to regulate the DC-bus voltage. The PI controller should have a very low bandwidth in order to prevent the low frequency ripple from propagating to the control loop through the DC-bus voltage feedback. Because of this, the conventional DC-bus voltage controller produces a very sluggish and poor transient response. This not only affects the performance of the DC/AC converter, but also forces the designer to over-design the converter in order to have reliable performance against the overshoots/undershoots that occur during transients.

Based on the above, there is therefore a need for developments which mitigate if not overcome the shortcomings of the prior art.

SUMMARY OF INVENTION

The present invention provides systems, methods, and devices for controlling a DC-bus voltage for a power conditioning system. A control system regulates the DC value of the DC-bus voltage. The control system uses an adaptive DC-value estimator/observer to estimate this DC-value. Instead of having to determine the DC-value of a signal with a low frequency ripple without compromising the signal's dynamic response, a suitably precise estimate for that DC-value is used.

In a first aspect, the present invention provides a control system for use in controlling a converter, the control system comprising:
  a voltage controller for controlling a voltage of said converter;
  a current controller for controlling a current of said converter;
  an observer/estimator for estimating a DC-bus voltage of said converter;
  wherein
  an estimate of said DC-bus voltage is subtracted from a measured DC-bus voltage of said converter;
  said current controller produces a value used to control a timing of opening and closing of switches in said converter.

In a second aspect, the present invention provides a component for estimating a DC-bus voltage of a converter, the component being represented by:

$$\Sigma_{v_{BUS}}: \begin{cases} \dot{\hat{\eta}}_1 = 2\omega(\hat{\eta}_2 + \eta_1 + \hat{V}_{DC}) + \xi_1 \tilde{\eta}_1 \\ \dot{\hat{\eta}}_2 = -4\omega\eta_1 - 2\omega\hat{\eta}_2 + \xi_2 \tilde{\eta}_1 \\ \dot{\hat{V}}_{DC} = 2\mu\omega\tilde{\eta}_1 \end{cases}$$

where $\xi_1 \in \Re^+$, $\xi_2 = 2\omega$, $\tilde{\eta}_1 = \eta_1 - \hat{\eta}_1$, and $\tilde{\eta}_2 = \eta_2 - \hat{\eta}_2$.

BRIEF DESCRIPTION OF THE DRAWINGS

The embodiments of the present invention will now be described by reference to the following figures, in which identical reference numerals in different figures indicate identical elements and in which.

DETAILED DESCRIPTION

The present invention relates to a DC-bus voltage controller which performs the DC-bus voltage regulation for a renewable energy power conditioning system. The present invention provides a new DC-bus voltage controller which is able to improve the transient response of the DC-bus voltage control loop significantly and provides a robust and reliable solution for multiple applications. The control scheme of the present invention is based on estimating the DC value of the DC-bus voltage through a specific adaptive filter. The structure of the filter provides a very fast and robust estimation for the DC value of the DC-bus voltage. The DC-extraction technique is able to precisely estimate the DC value in the presence of a double frequency ripple on top of the the DC-bus voltage.

Figure 1A:
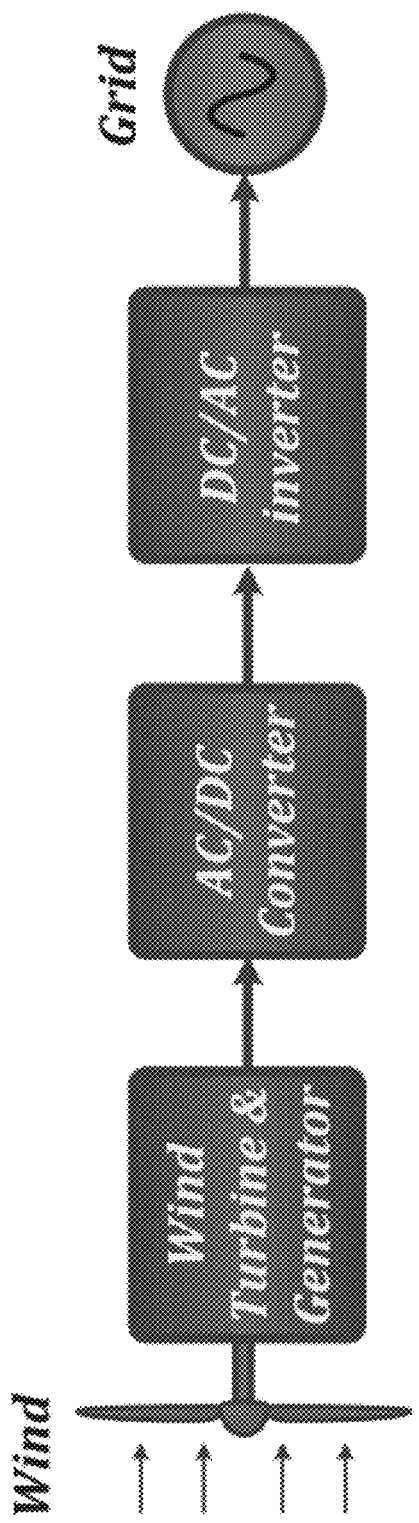
FIG. 1A is a circuit diagram for an AC/DC rectifier for wind turbines according to the prior art.
Figure 1B:
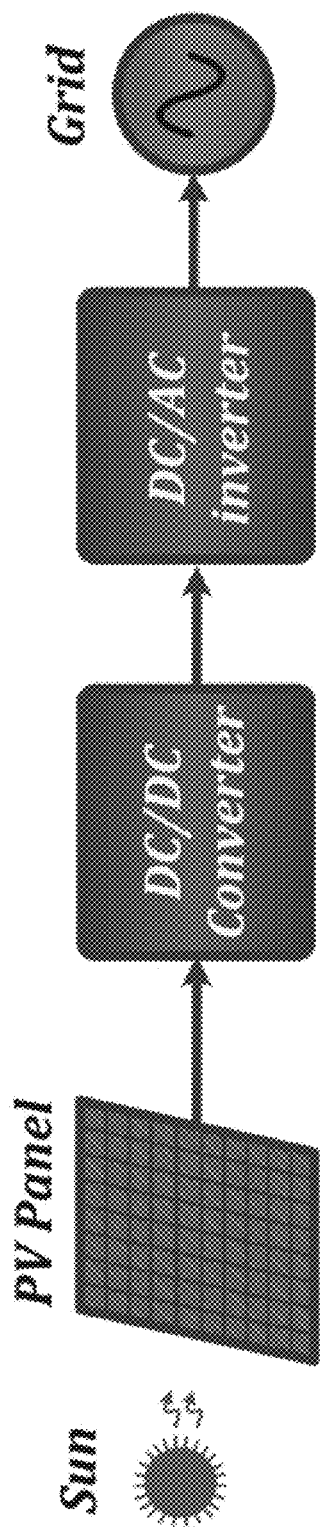
FIG. 1B is a circuit diagram for a DC/DC converter for photovoltaic solar farms according to the prior art.
Figure 2:
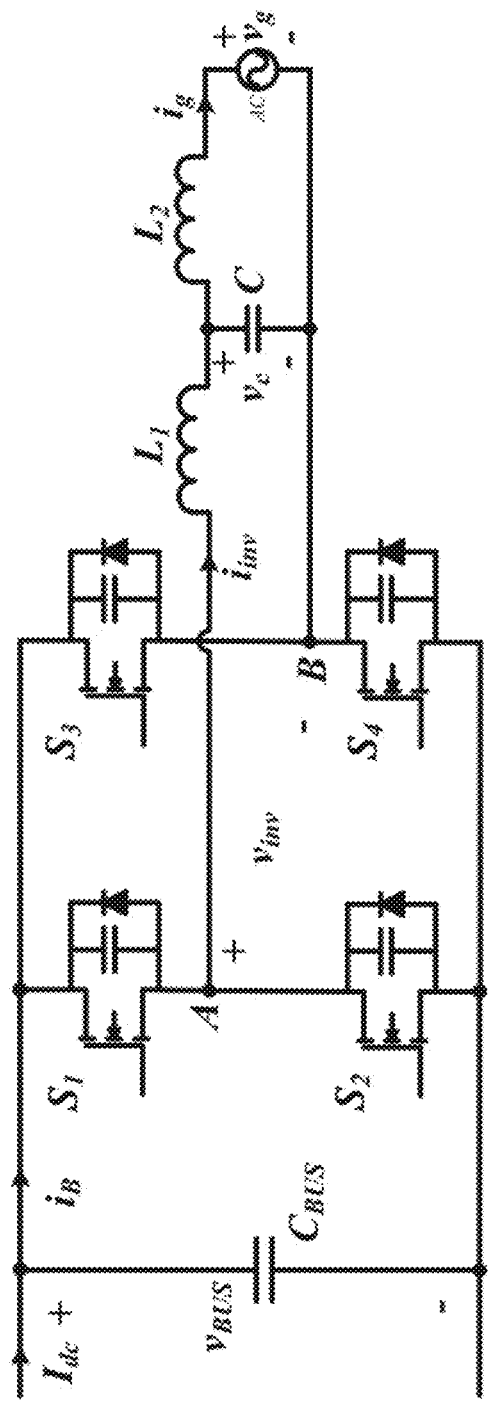
FIG. 2 is a schematic of a grid connected DC/AC converter with an LCL-filter.

Referring to FIG. 2, a schematic of a grid-connected DC/AC converter with an LCL-filter is shown. LCL-filters are widely used at the output of the DC/AC in order to filter out the high frequency components produced by switching and to thereby deliver a high quality current to the utility grid. LCL-filters provide better attenuation than comparably sized L-filters (i.e., attenuation for LCL-filters is at −60 dB/dec while attenuaton for L-filters is at −20 dB/dec).

Between the two stages of a power conditioning system, there is a DC-bus which is supported by a fairly large capacitor depending on the system specifications. This capacitor acts as an energy storage capacitor and provides the flexibility of alternating the instantaneous energy in the power conditioning system. Erratic behaviour of the renewable energy sources demand a fairly robust control system in order to smoothly control the power flow between the two stages of the power conditioning system.

Figure 3:
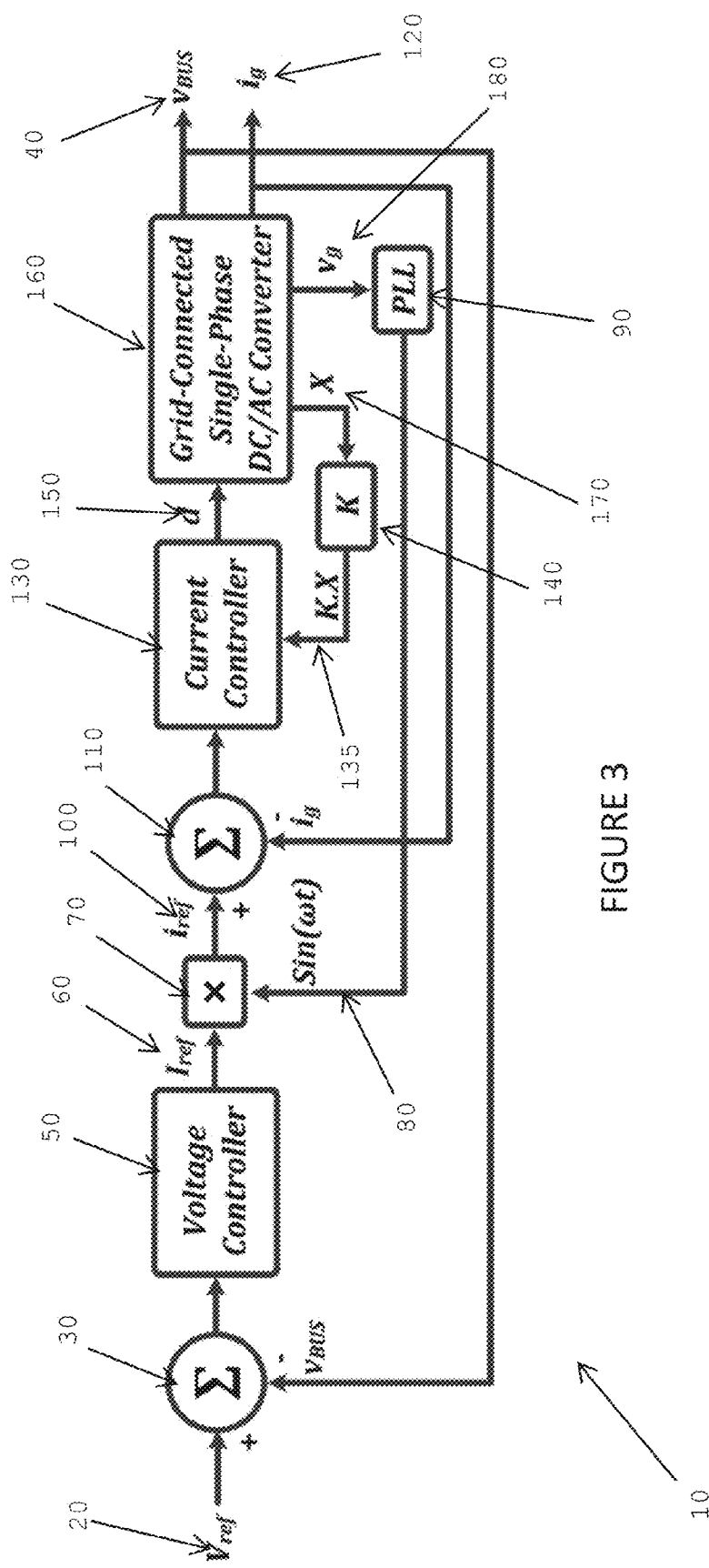
FIG. 3 is a block diagram of a voltage control system for a single-phase grid-connected DC/AC converter.

FIG. 3 shows a typical block diagram of a voltage control system for a single-phase grid-connected DC/AC converter. In FIG. 3, the voltage control system 10 has a reference voltage 20 as input to the system 10. An adder 30 substracts the reference voltage 20 from the DC-bus voltage ($v_{BUS}$) 40 of the converter. The output of the adder 30 is then sent to a voltage controller 50. The result of the voltage controller 50 is a reference current ($I_{ref}$) 60 which is sent to a multiplier 70. The multiplier 70 multiplies the reference current 60 with a signal 80 (sin(ωt)) from a PLL 90. The output 100 ($i_{ref}$) of the multiplier 70 is sent to another adder 110. The adder 110 subtracts a current output 120 ($i_g$) of the converter from this output 100 of the multiplier 70. The output 120 of the adder 110 is then sent to a current controller 130. As another input to the current controller 130, a value 135 (K·X) from a multiplier block 140. The output of the current controller is a value 150 (inverter output voltage duty cycle d) that is fed into a DC/AC converter 160. The converter 160 outputs a value 170 for a system state variable (X) that is fed into multiplier 140. As well, the converter outputs a signal 180 (grid voltage $v_g$) that is fed into PLL 90.

According to FIG. 3, an external voltage control loop regulates the DC-bus voltage of the converter. The voltage controller determines the amplitude of the current to be injected to the grid such that the power balance between the first-stage and second-stage is satisfied, or equivalently, that the DC-bus voltage is maintained at a constant. Because the voltage controller deals with DC signals, PI regulators are usually used to implement this controller. The main issue with this control approach is that a significant amount of double frequency ripple is present on the DC-bus voltage due to the inevitable power ripple inherent in single-phase power conditioning systems (this ripple is also present in three-phase unbalanced systems). This double frequency ripple is produced by the output power and reflected back on to the DC-bus voltage. The low frequency component is superimposed on top of the DC-bus voltage component. Since the power ripple is imposed on the DC-bus voltage, this causes challenges for the DC-bus voltage controller. The double frequency ripple will propagate to the current loop if the DC-bus voltage controller does not remove it. Removal of the double frequency ripple from the DC-bus voltage can have repercussions. In order for the PI controller to remove the double frequency ripple, its bandwidth must be lowered significantly. This will result in a very sluggish transient performance and an inability to deal with sudden changes in the input power. Thus, when there is a sudden transient, the voltage across the DC-bus capacitor will fluctuate considerably. As a result, the DC-bus capacitor and converter switches will need to be overrated so that they can perform reliably and do not burn out. This not only causes an increase in system costs but also results in very poor transient performance and marginal stability.

The voltage loop controller is designed to regulate the DC value of the DC-bus voltage. Extracting the DC-value of a signal with a low frequency ripple without compromising the dynamic response is very challenging, especially since low pass filters with low bandwidth introduce a large delay into the filtered signal. The present invention, in one aspect, provides a novel fast DC value extraction without compromising the dynamics. The DC-bus voltage has a DC value with a superimposed double-frequency ripple. Therefore, the DC-bus voltage is represented by:

$$v_{BUS} = V_{DC} + V_{ripple} \sin(2\omega t) \qquad (1)$$

The objective is to extract $V_{DC}$ from $v_{BUS}$ without introducing a delay to the signal. From Eqn. (1), the following equations are derived:

$$\dot{v}_{BUS} = 2\omega V_{ripple} \cos(2\omega t) \qquad (2)$$

$$\ddot{v}_{BUS} = -4\omega^2 V_{ripple} \sin(2\omega t) \qquad (3)$$
$$= -4\omega^2 (v_{BUS} - V_{DC})$$

From the above, the following equation describes the dynamics of the DC-bus voltage:

$$\ddot{v}_{BUS} + 4\omega^2 v_{BUS} - 4\omega^2 V_{DC} = 0 \qquad (4)$$

Eqn. (4) represents a second order system and can be presented in the standard form as follows:

$$\Sigma_{v_{BUS}} : \begin{cases} \dot{x}_1 = 2\omega x_2 \\ \dot{x}_2 = -2\omega(x_1 - V_{DC}) \end{cases} \qquad (5)$$

where $x_1 = v_{BUS}$ and $$x_2 = \frac{1}{2\omega}\dot{x}_1.$$

The objective is to estimate $V_{DC}$ from the dynamics given in Eqn. (5). Since $V_{DC}$ is in the second equation of Eqn. (5) and $x_2$ is not measurable, a change of variables need to be performed. The change of variable used in this invention is given by:

$$\eta_1 = x_1 \quad (6)$$

$$\eta_2 = x_2 - x_1 - V_{DC} \quad (7)$$

The system dynamics with the new variables are given by:

$$\Sigma_{v_{BUS}} : \begin{cases} \dot{\eta}_1 = 2\omega(\eta_2 + \eta_1 + V_{DC}) \\ \dot{\eta}_2 = -4\omega\eta_1 - 2\omega\eta_2 \end{cases} \quad (8)$$

Eqn. (8) is in the proper form for designing the observer which will perform the estimation. The change of variables, using Eqns. (6)-(7), makes it possible to design the observer as the desired parameter, $V_{DC}$, now appears in the measurable variable dynamics $\dot{\eta}_1$. The adaptive observer for $V_{DC}$ can thus be designed as:

$$\hat{\Sigma}_{v_{BUS}} : \begin{cases} \dot{\hat{\eta}}_1 = 2\omega(\hat{\eta}_2 + \eta_1 + \hat{V}_{DC}) + \xi_1 \tilde{\eta}_1 \\ \dot{\hat{\eta}}_2 = -4\omega\eta_1 - 2\omega\hat{\eta}_2 + \xi_2 \tilde{\eta}_1 \\ \dot{\hat{V}}_{DC} = 2\mu\omega\tilde{\eta}_1 \end{cases} \quad (9)$$

where, $\xi_1 \in \Re^+$, $\xi_2 = 2\omega$, $\tilde{\eta}_1 = \eta_1 - \hat{\eta}_1$, and $\tilde{\eta}_2 = \eta_2 - \hat{\eta}_2$.

The error dynamics for this adaptive observer is derived as:

$$\tilde{\Sigma}_{v_{BUS}} : \begin{cases} \dot{\tilde{\eta}}_1 = 2\omega(\tilde{\eta}_2 + \tilde{V}_{DC}) - \xi_1 \tilde{\eta}_1 \\ \dot{\tilde{\eta}}_2 = -2\omega\tilde{\eta}_2 - \xi_2 \tilde{\eta}_1 \\ \dot{\tilde{V}}_{DC} = -2\mu\omega\tilde{\eta}_1 \end{cases} \quad (10)$$

where $\tilde{V}_{DC} = V_{DC} - \hat{V}_{DC}$.

The existence and boundedness of the solution of Eqn. (10) are guaranteed by using the following Lyapunov function:

$$V = \frac{1}{2}\tilde{\eta}_1^2 + \frac{1}{2}\tilde{\eta}_2^2 + \frac{1}{2\mu}\tilde{V}_{DC}^2 \quad (11)$$

The derivative of the Lyapunov function is given by:

$$\dot{V} = \tilde{\eta}_1 \dot{\tilde{\eta}}_1 + \tilde{\eta}_2 \dot{\tilde{\eta}}_2 + \tilde{V}_{DC} \dot{\tilde{V}}_{DC} \quad (12)$$
$$= -\xi_1 \tilde{\eta}_1^2 - 2\omega \tilde{\eta}_2^2$$

According to Eqn. (12), the derivative of the Lyapunov function is negative semi-definite (i.e. it is not negative definite). Eqn. (12) only guarantees that the error signals $\tilde{\eta}_1$ and $\tilde{\eta}_2$ converge to zero. However, only the boundedness of $\tilde{V}_{DC}$ is guaranteed, not the asymptotic convergence. The particular structure of the adaptive observer provides the necessary and sufficient condition to prove the asymptotic convergence of $\tilde{V}_{DC}$. The asymptotic convergence is proven by using the persistency of excitation theorem. This theorem states that if the update law $\dot{\hat{V}}_{DC}$ is persistently excited, the global asymptotic stability is concluded for the estimation errors. In particular, in order to have persistency of excitation, the following condition must be satisfied for two positive real values T and k:

$$\int_t^{t+T} \dot{\hat{V}}_{DC}^2(\tau) d\tau \geq k > 0 \quad (13)$$

Because there is inherently a double-frequency ripple present at the DC-bus voltage, the update law $\dot{\hat{V}}_{DC} = 2\mu\omega\tilde{\eta}_1$ is constantly being excited. In particular, by choosing $T = 1/(2\omega t)$ (i.e. half a line cycle) and convergence of $\hat{\eta}_1$ to an arbitrary dc value with a double frequency ripple given by:

$$\|V_{ripple}\|_{peak} = \frac{P_{in}}{2\omega_{line} C_{BUS} V_{BUS}} \quad (14)$$

the condition for the theorem is satisfied. Thus, the update law in the adaptive observer is persistently excited. The persistency of excitation theorem proves the globally exponentially stable equilibrium point (0,0,0) for $(\tilde{\eta}_1, \tilde{\eta}_2, \tilde{\eta}_{DC})$.

From the above, it has rigorously been shown how the proposed observer precisely estimates the DC value of the DC-bus voltage. Intuitively, the observer operates based on the energy of the estimation errors. The natural double frequency ripple in the system persistently excites the system. This persistent excitation provides energy for the estimated parameter, $V_{DC}$ to converge to its actual value.

Figure 4:
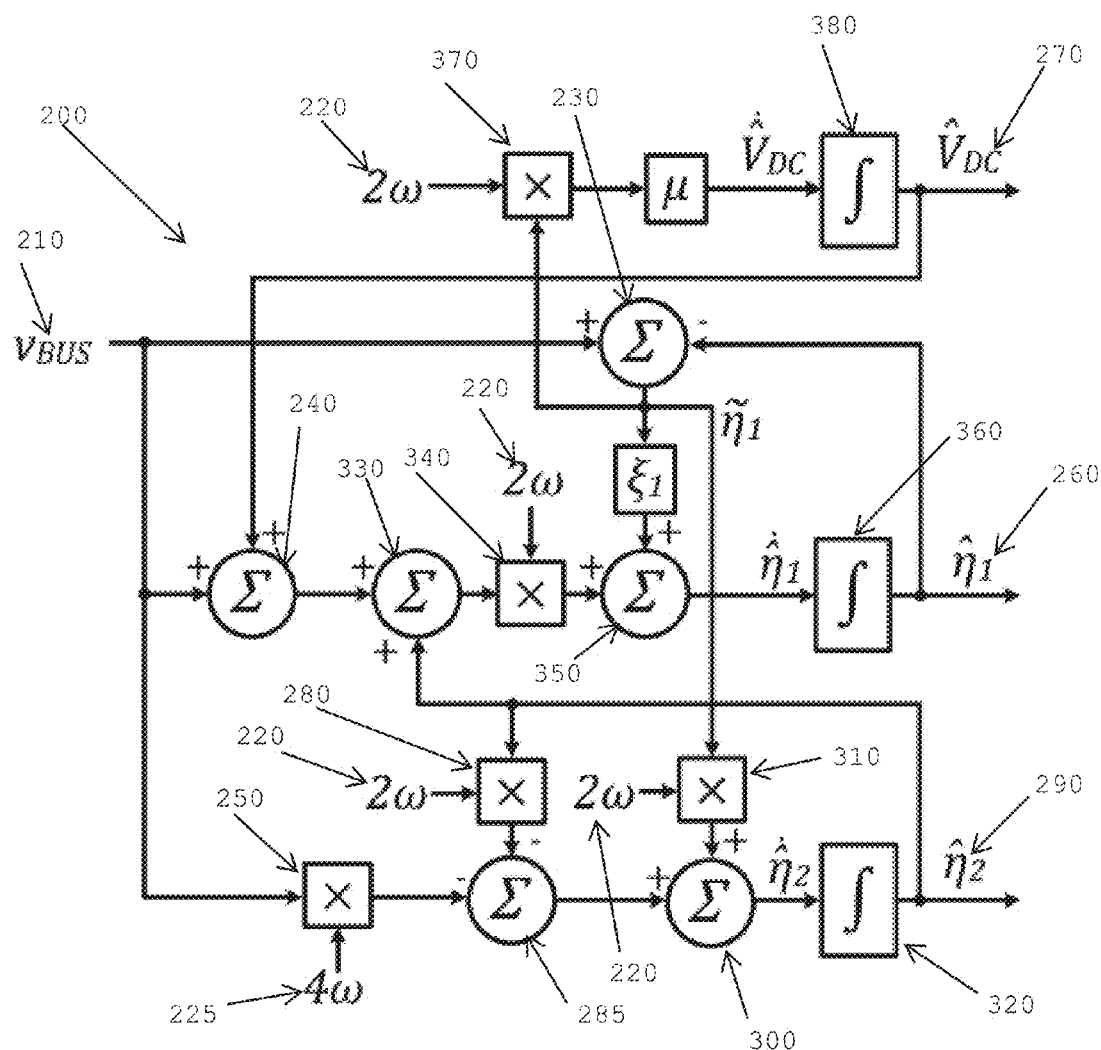
FIG. 4 is a block diagram of a DC-value observer/estimator according to one aspect of the invention.

The adaptive observer described by Eqn. (9) is able to estimate the DC value of DC-bus voltage very quickly. The block diagram of the DC-value observer is shown in FIG. 4. Using this observer to extract the DC value of the DC-bus voltage allows the voltage controller to have a very high bandwidth. Since the double frequency ripple becomes completely isolated from the control loop, the bandwidth of the voltage loop controller can be significantly increased when compared to the bandwidth for a conventional voltage control loop.

Referring to FIG. 4, the inputs to the observer 200 are the DC-bus voltage 210 ($v_{BUS}$) of the converter 160, the value 220 ($2\omega$), and the value 225 ($4\omega$). The output voltage 210 is sent to a first adder 230, a second adder 240, and a multiplier 250. The adder 230 subtracts an output 260 ($\hat{\eta}_1$) of the observer from the DC-bus voltage 210. The adder 240 adds another output 270 ($\hat{V}_{DC}$) to the DC-bus voltage 210. This output 270 is an estimated DC voltage used by the controller. The multiplier 250 multiplies the value 225 with the DC-bus voltage 210. The output of this multiplier 250 is then subtracted with the output of another multiplier 280 by way of adder 285. This multiplier 280 multiplies the value 220 with another output 290 (($\hat{\eta}_2$). The output of adder 285 is added by adder 300 to the result of multiplier 310. Multiplier 310 multiplies value 220 with the result of adder 230. The result of adder 300 is then integrated by integrator 320 to result in output 290.

Continuing the reference to FIG. 4, the result of adder 240 is received by another adder 330. Adder 330 adds the result of adder 240 to the output 290 of the observer 200. The result of adder 330 is multiplied by multiplier 340 with value 220. The result of multiplier 340 is then added to the result of adder 230 by adder 350. The output of this adder 350 is then integrated by integrator 360. The result of integrator 360 is the output 260.

At the top of FIG. 4, the value 220 is multiplied by multiplier 370 to the result of adder 230. The result of multiplier 370 is then integrated by integrator 380 to result in output 270.

Figure 5:
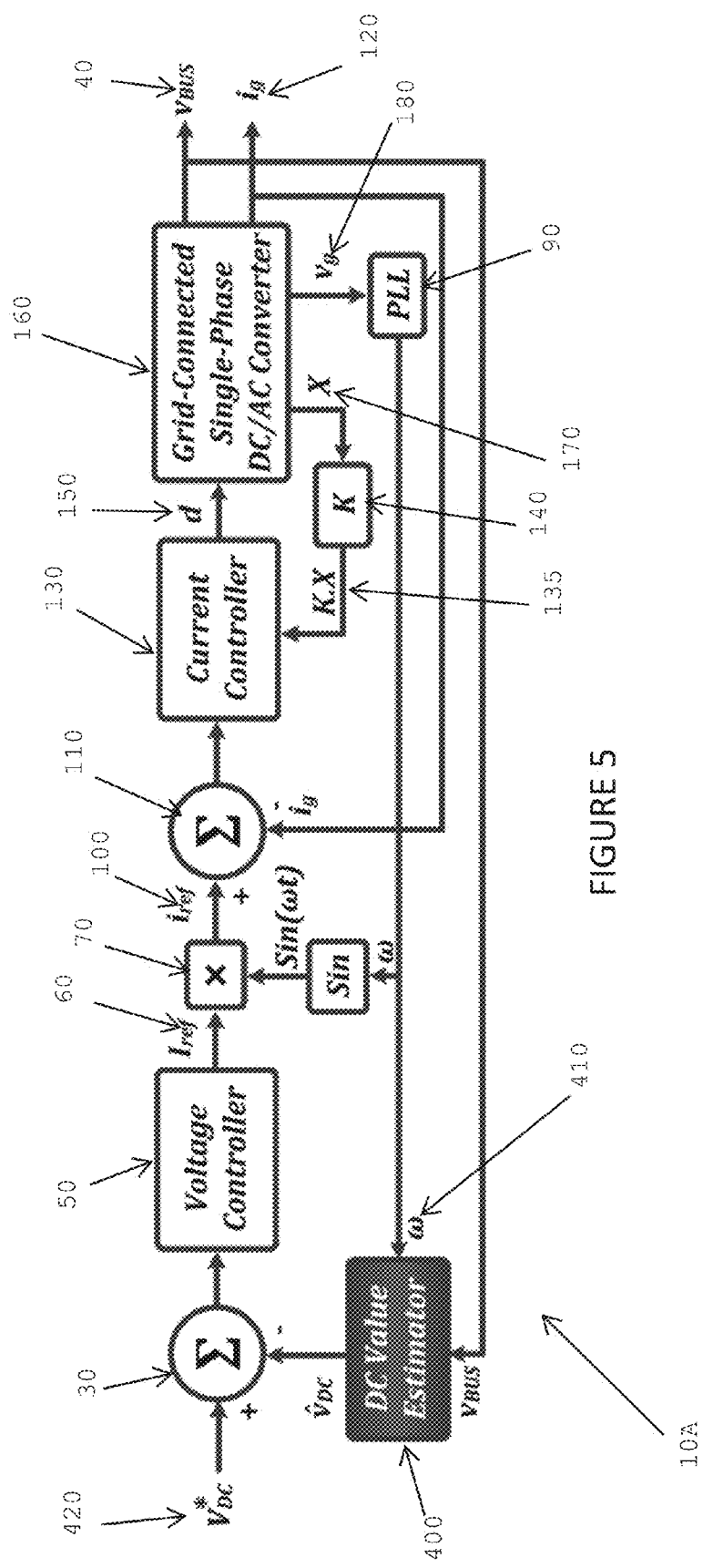
FIG. 5 is a block diagram of a closed-loop control system with a DC value observer according to one aspect of the invention.

The arrangement, shown in FIG. 5, represents the block diagram of the closed-loop control system with the DC value observer. The DC-value Estimator block (shown in detail in FIG. 4) implements Eqn. (9).

Referring to FIG. 5, the control system in FIG. 5 is similar to the control system in FIG. 3 with the addition of a DC-value estimator 400. For ease of reference, reference numerals in FIG. 3 for similar elements are used in FIG. 5. The DC-value estimator 400 (also referred to as an observer) receives a value 410 ($\omega$) from PLL 90. Along with this, the DC-value estimator 400 also receives DC-bus voltage ($v_{BUS}$) 40 of the converter 160. The result of the DC-value estimator 400 is subtracted from the input 420 $V_{DC}$ by way of adder 30.

Figure 6:
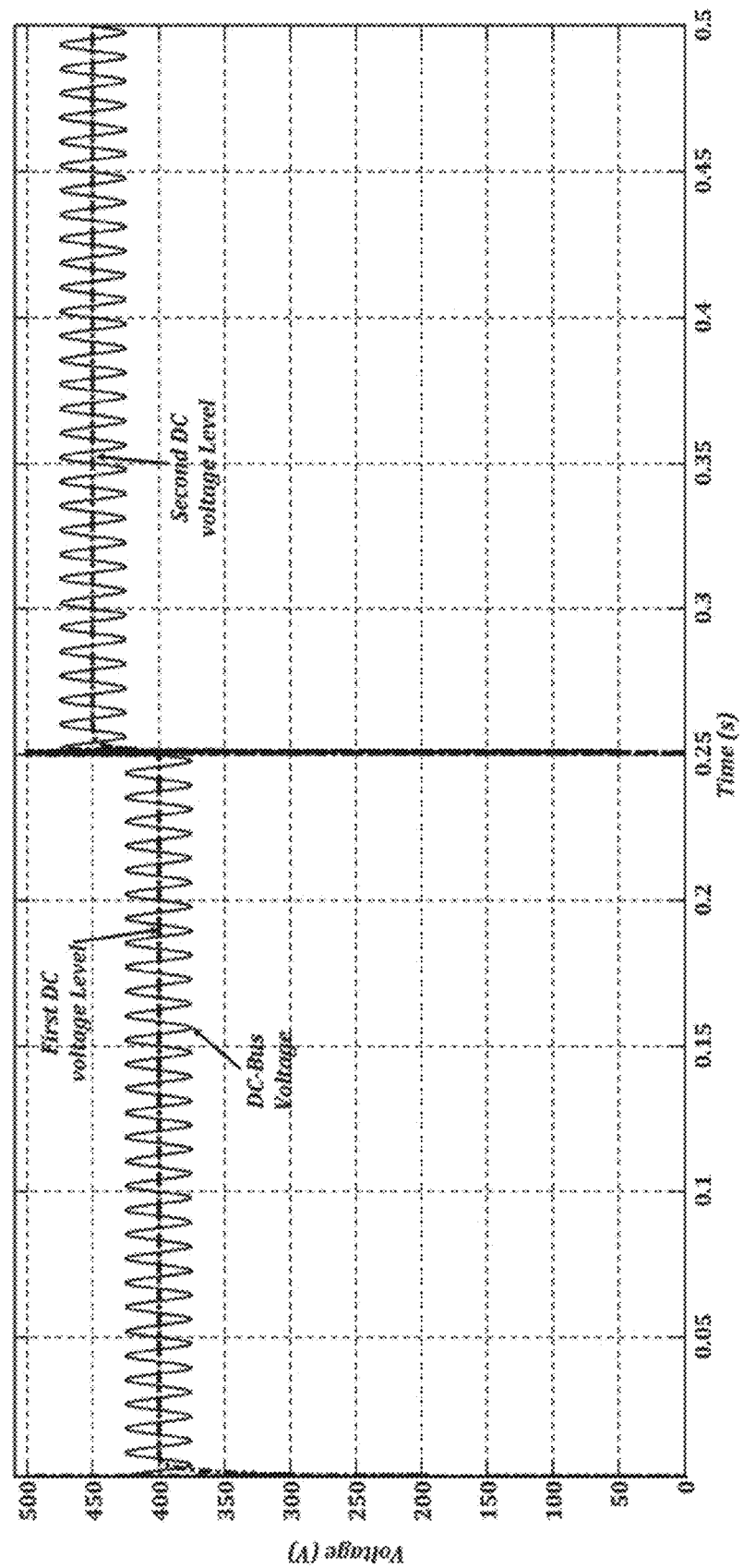
FIG. 6 illustrates the transient response of the observer/estimator for a step change in the DC-bus voltage.
Figure 7:
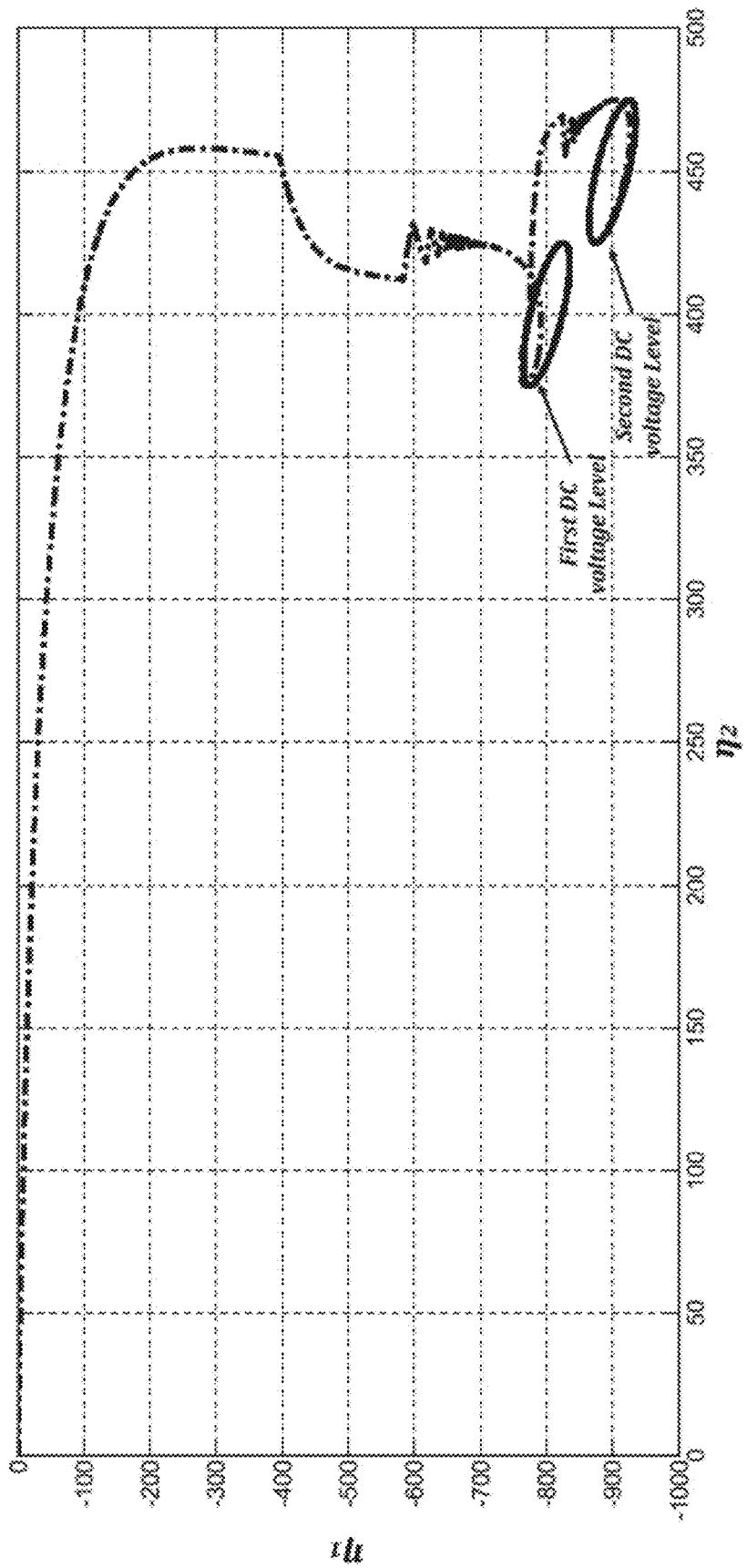
FIG. 7 shows the trajectory for $\eta_1$ and $\eta_2$ when the step change in FIG. 6 is applied.
Figure 8:
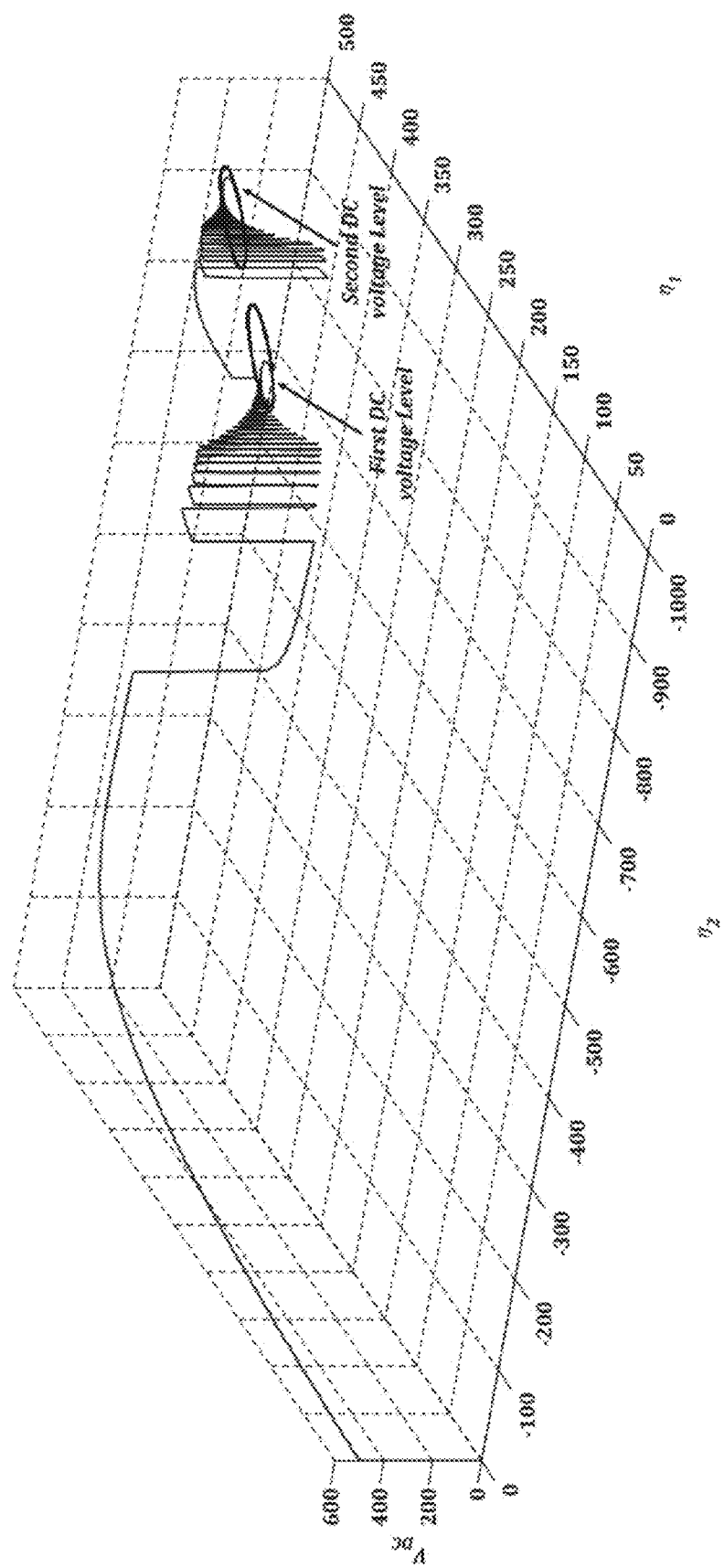
FIG. 8 shows the trajectory of the control system for the transient in FIG. 7.

FIG. 6 shows the transient response of the adaptive observer for a step change in the DC-bus voltage. This figure demonstrates a very fast estimation of the DC component of the DC-bus voltage. FIG. 7 shows the trajectory of $\eta_1$ and $\eta_2$ when the step change is applied. According to FIG. 7, the system is steered from a first DC voltage level to the second DC voltage level when the step change is applied. FIG. 8 shows the trajectory of the system for this transient. The steady-state limit cycles for two DC voltage levels are evident in FIG. 8.

Figure 9:
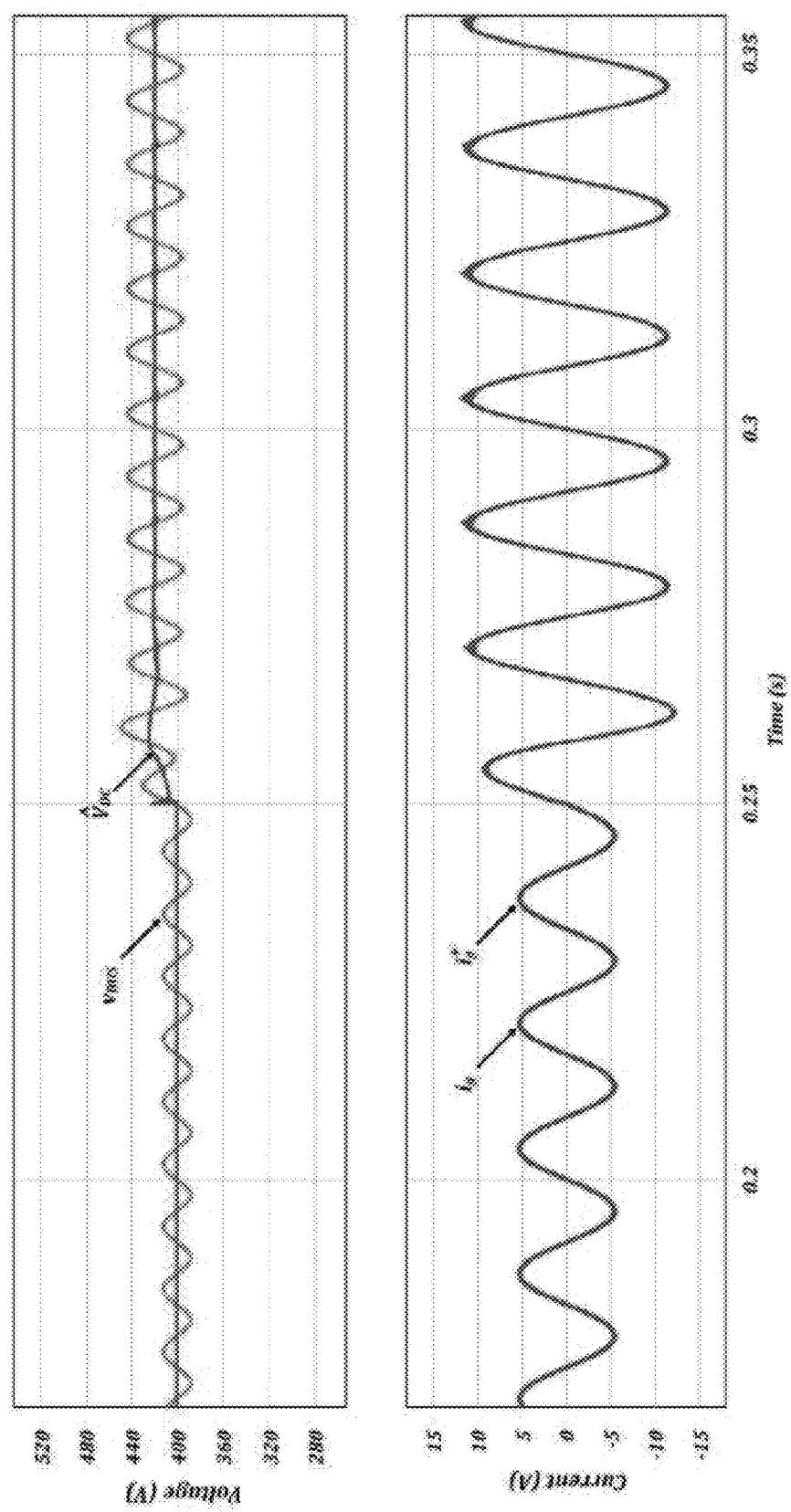
FIG. 9 illustrates the performance of the closed loop control system in FIG. 5 for positive step changes.
Figure 10:
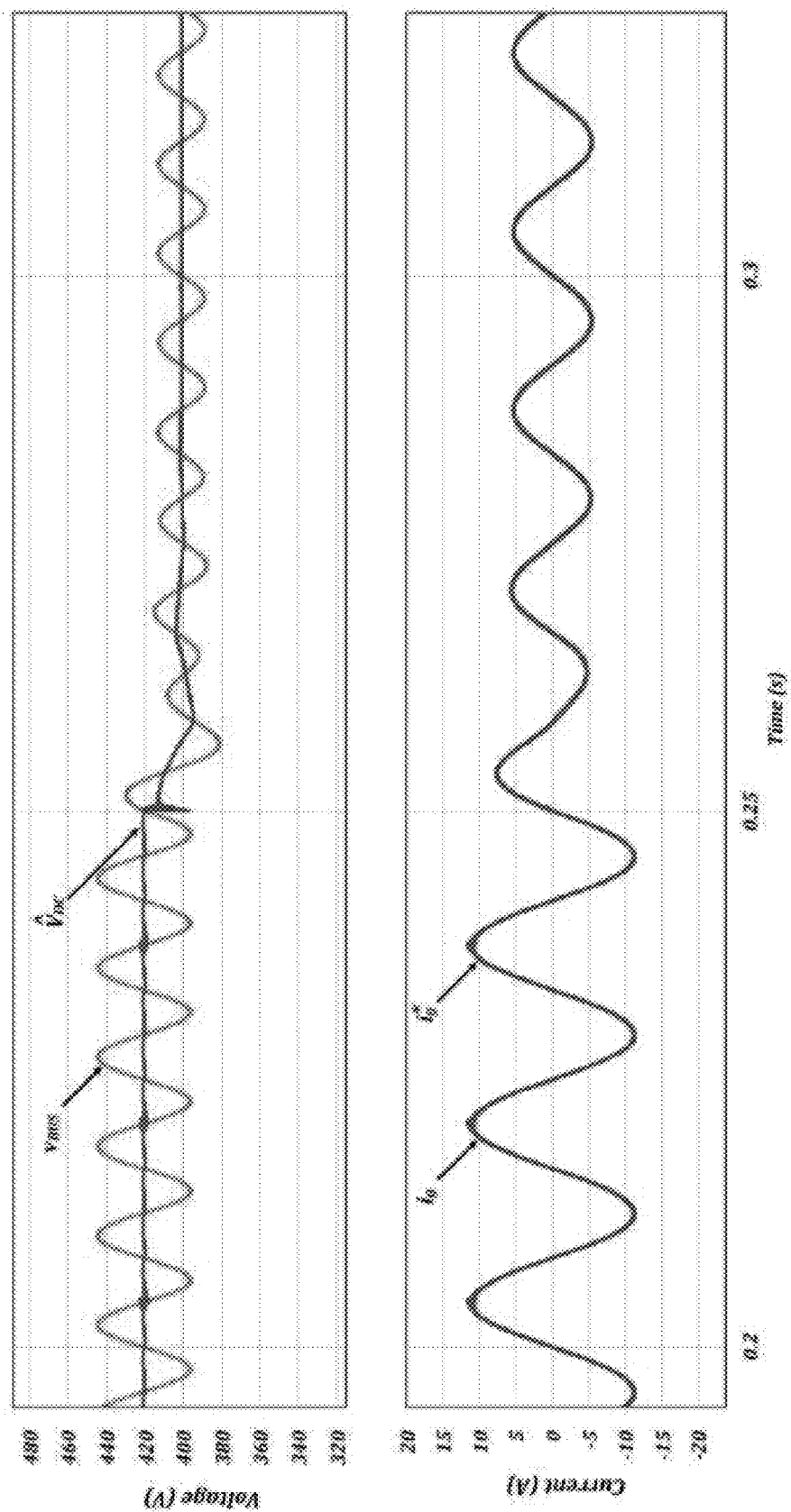
FIG. 10 illustrates the performance of the closed loop control system in FIG. 5 for negative step changes.

The performance of the closed-loop control system is illustrated in FIG. 9 and FIG. 10 for positive and negative step changes respectively. According to FIG. 9 and FIG. 10, the observer provides a very fast and accurate estimation of the DC value of the DC-bus voltage. Therefore, a very fast transient response is achievable with the closed-loop control system.

Figure 11:
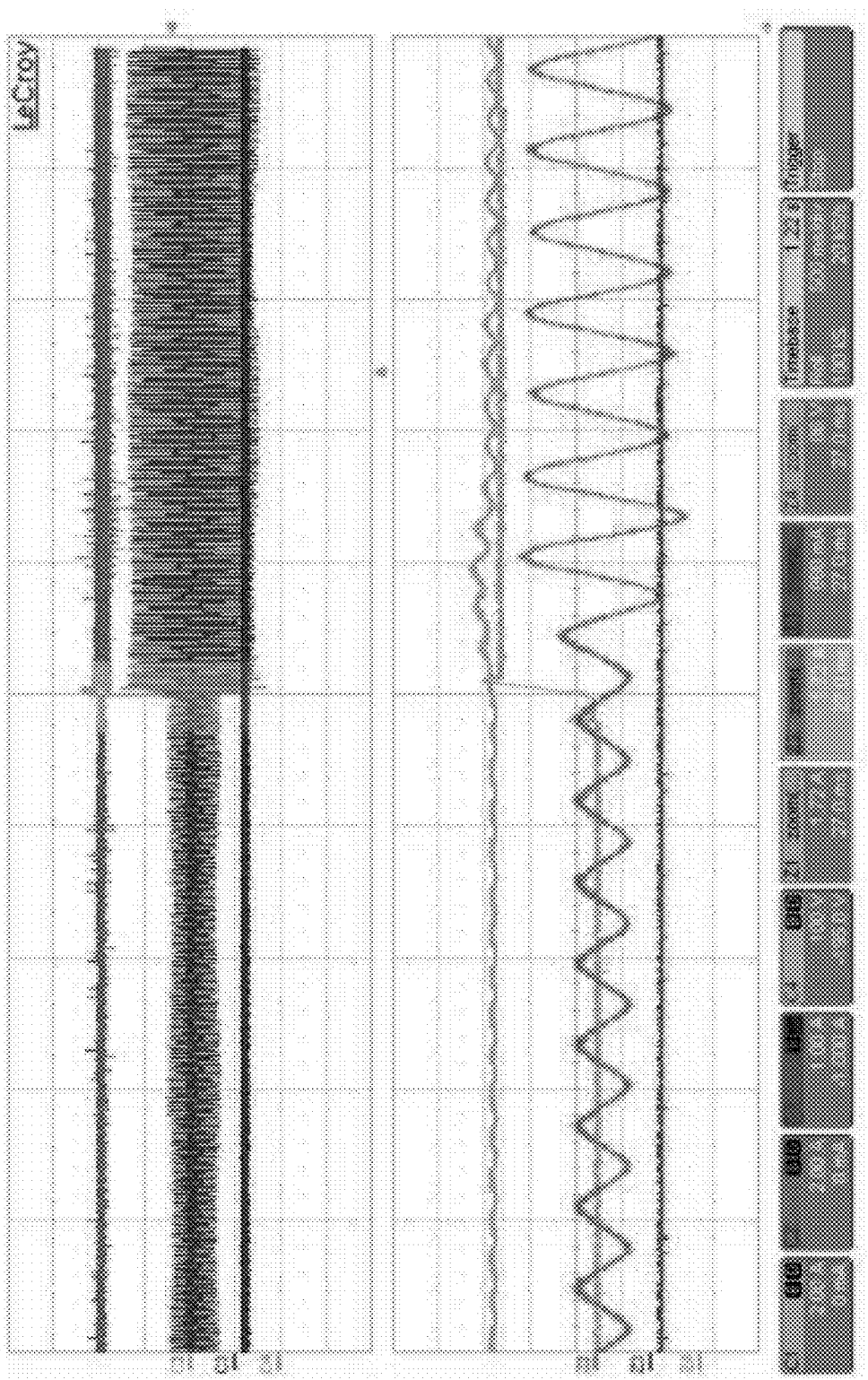
FIG. 11 shows experimental waveforms from an experimental prototype of one aspect of the invention.

FIG. 11 shows the experimental waveforms obtained from an experimental prototype. The experimental prototype is a 1 kW grid-connected photovoltaic (PV) micro-inverter. a 50% step load change is applied to the system by increasing the converter input power (through the PV simulator). This figure shows a smooth and stable transient response of the proposed voltage loop control system.

It should be noted that the observer of the invention may also be implemented as a suitably programmed ASIC to provide the requisite control signals for the power semiconductors in the PFC converter.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object-oriented language (e.g."C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A control system for use in controlling a converter, the control system comprising:

a voltage controller for controlling a voltage of said converter;

a current controller for controlling a current of said converter;

an observer/estimator for estimating a DC-bus voltage of said converter; wherein an estimate of said DC-bus voltage is subtracted from a measured DC-bus voltage of said converter;

said current controller produces a value used to control a timing of opening and closing of switches in said converter; and said observer/estimator is represented by:

$$\hat{\Sigma}_{v_{BUS}}: \begin{cases} \dot{\hat{\eta}}_1 = 2\omega(\hat{\eta}_2 + \eta_1 + \hat{V}_{DC}) + \xi_1 \tilde{\eta}_1 \\ \dot{\hat{\eta}}_2 = -4\omega\eta_1 - 2\omega\hat{\eta}_2 + \xi_2 \tilde{\eta}_1 \\ \dot{\hat{V}}_{DC} = 2\mu\omega\tilde{\eta}_1 \end{cases}$$

where, $\xi_1 \in \mathfrak{R}^+$, $\mathfrak{R}^+$ being a positive constant number, $\xi_2 = 2\omega$, $\omega$ being a line frequency, $\eta_1 = v_{bus}$, $v_{bus}$ being the DC-bus voltage, $$\eta_2 = \frac{1}{2\omega}\dot{v}_{bus} - v_{bus} - V_{DC}$$

$\tilde{\eta}_1 = \eta_1 - \hat{\eta}_1$, $\tilde{\eta}_1$ being an estimation error of the DC-bus voltage, $\tilde{\eta}_2 = \eta_2 - \hat{\eta}_2$, $\tilde{\eta}_2$ being an estimation error of $\eta_2$, $\hat{V}_{DC}$ is an estimated value of $V_{DC}$, $V_{DC}$ being a DC component of the DC bus voltage, $\hat{\eta}_2$ is an estimated value of $\eta_2$, $\hat{\eta}_1$ is an estimated value of $\eta_1$, and $\mu \in \mathfrak{R}^+$, $\mathfrak{R}^+$ being a positive constant number.

2. A control system according to claim 1, wherein said DC-bus voltage has a low frequency ripple.

3. A control system according to claim 1, wherein said converter is a single-phase DC/AC converter.

4. A control system according to claim 1, wherein said estimator/observer has error dynamics represented as:

$$\tilde{\Sigma}_{v_{BUS}}: \begin{cases} \dot{\tilde{\eta}}_1 = 2\omega(\tilde{\eta}_2 + \tilde{V}_{DC}) - \xi_1\tilde{\eta}_1 \\ \dot{\tilde{\eta}}_2 = -2\omega\tilde{\eta}_2 - \xi_2\tilde{\eta}_1 \\ \dot{\tilde{V}}_{DC} = -2\mu\omega\tilde{\eta}_1 \end{cases}$$

where $\tilde{V}_{DC} = V_{DC} - \hat{V}_{DC}$, $\tilde{V}_{DC}$ being an error of an estimation for $V_{DC}$.

5. A control system according to claim 4, wherein error signals for said estimator/observer converge to zero.

6. A component for estimating an output voltage of a converter, the component being represented by:

$$\hat{\Sigma}_{v_{BUS}}: \begin{cases} \dot{\hat{\eta}}_1 = 2\omega(\hat{\eta}_2 + \eta_1 + \hat{V}_{DC}) + \xi_1\tilde{\eta}_1 \\ \dot{\hat{\eta}}_2 = -4\omega\eta_1 - 2\omega\hat{\eta}_2 + \xi_2\tilde{\eta}_1 \\ \dot{\hat{V}}_{DC} = 2\mu\omega\tilde{\eta}_1 \end{cases}$$

where, $\xi_1 \in \mathfrak{R}^+$, $\mathfrak{R}^+$ being a positive constant number, $\xi_2 = 2\omega$, $\omega$ being a line frequency, $\tilde{\eta}_1 = \eta_1 - \hat{\eta}_1$, $\tilde{\eta}_1$ being an estimation error of a DC-bus voltage, $\tilde{\eta}_2 = \eta_2 - \hat{\eta}_2$, $\tilde{\eta}_2$ being an estimation error of $\eta_2$, $\eta_1 = v_{bus}$, $v_{bus}$ being the DC-bus voltage, $$\eta_2 = \frac{1}{2\omega}\dot{v}_{bus} - v_{bus} - V_{DC},$$

$\hat{V}_{DC}$ is an estimated value of $V_{DC}$, $V_{DC}$ being a DC component of the DC-bus voltage, $\hat{\eta}_2$ is an estimated value of $\eta_2$, $\hat{\eta}_1$ is an estimated value of $\eta_1$, and $\mu \in \mathfrak{R}^+$, $\mathfrak{R}^+$ being a positive constant number.

7. A component according to claim 6, wherein said converter is a single-phase DC/AC converter.

8. A component according to claim 6, wherein said component is part of a control system for controlling said converter.

* * * * *

UNITED STATES PATENT AND TRADEMARK OFFICE
CERTIFICATE OF CORRECTION

PATENT NO. : 9,537,424 B2
APPLICATION NO. : 14/674910
DATED : January 3, 2017
INVENTOR(S) : Majid Pahlevaninezhad et al.

It is certified that error appears in the above-identified patent and that said Letters Patent is hereby corrected as shown below:

On the Title Page

Item (72) should read:
(72) Inventors: Majid Pahlevaninezhad, Kingston (CA);
  Susan Eren, Kingston (CA);
  Shangzhi Pan, Kingston (CA);
  Praveen Jain, Kingston (CA)

Signed and Sealed this
Fourth Day of December, 2018

Andrei Iancu
*Director of the United States Patent and Trademark Office*